J. Meyer,

Metal Drill,

No. 1,765. Reissued Sept. 13, 1864.

Witnesses:

J. W. Crombs

E. R. Kiza

Inventor:

John Meyer

N. PETERS, PHOTO-LITHOGRAPHER, WASHINGTON, D. C.

UNITED STATES PATENT OFFICE.

JOHN MEYER, OF BROOKLYN, NEW YORK.

IMPROVEMENT IN MACHINES FOR BORING METAL.

Specification forming part of Letters Patent No. 38,908, dated June 16, 1863; Reissue No. 1,765, dated September 13, 1864.

*To all whom it may concern:*

Be it known that I, JOHN MEYER, of No. 16 Water street, Brooklyn, in the county of Kings and State of New York, have invented a new and Improved Boring-Machine; and I do hereby declare that the following is a full, clear, and exact description thereof, which will enable those skilled in the art to make and use the same, reference being had to the accompanying drawings, forming part of this specification, in which—

Figure 1:
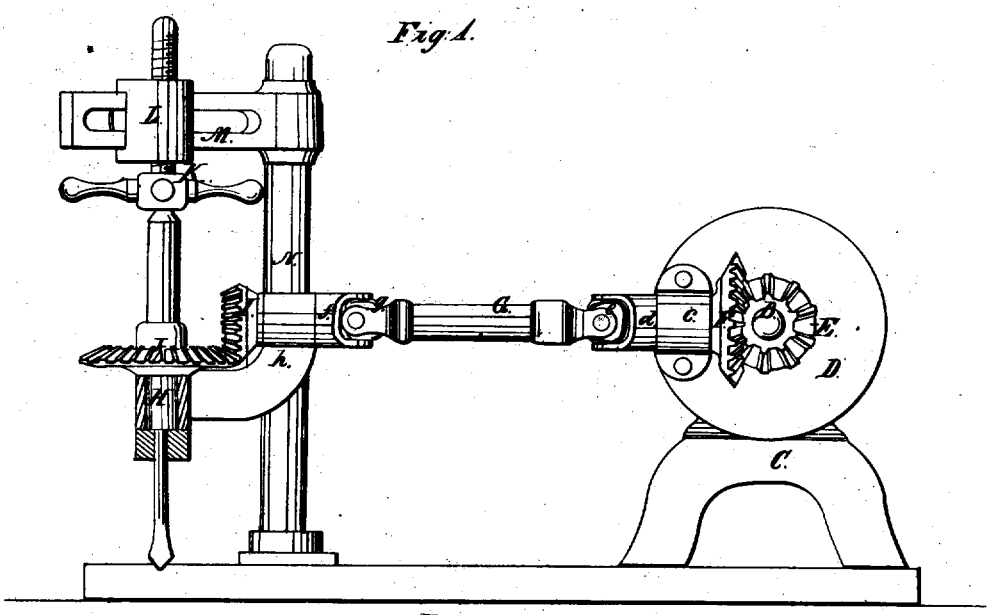
Figure 2:
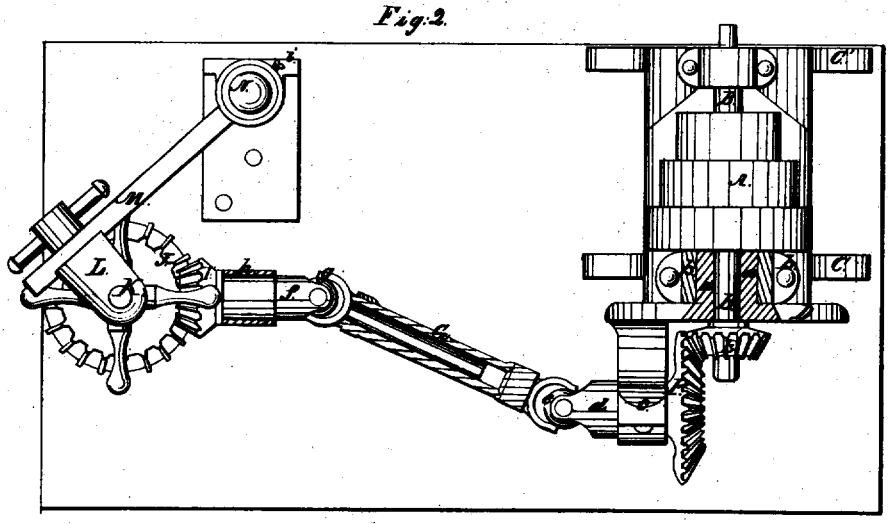

Figure 1 represents a side elevation of this invention. Fig. 2 is a sectional plan or top view of the same.

Similar letters of reference indicate corresponding parts.

The object of this invention is to produce a boring-machine which allows of shifting the drill to any desired place and of adjusting the the same in any desired direction without disturbing its connection with the driving-gear and with the line-shaft.

The invention consists in the application of an extension-rod provided with universal joints at one or both ends (in combination with the driving-spindle and with the bore-spindle) in such a manner that said bore-spindle can be carried to a long or short distance from the driving-spindle, and the drill adjusted in any desired direction, without interrupting the connection between the two spindles; further, in the employment of a swivel arm or disk in combination with the bevel-gear forming the connection between the driving-spindle or bore-spindle and extension-rod in such a manner that the bevel-wheel or the end of the extension-rod can be carried round the center of the driving-spindle or the bevel-wheel or the bore-spindle round the center of the extension-rod without throwing the wheels out of gear; finally, in the combination of two swivel arms or disks—one on the driving-spindle and one on the bore-spindle—with the extension-rod in such a manner that the drill can be carried round the driving-spindle and adjusted in any desired direction and at any desired distance from the driving-spindle without interrupting or disturbing the connection between the several parts of the boring-machine.

A represents a cone-pulley with three or more speeds, which is secured to the shaft B, and which is driven by a belt from the line-shaft or from any desired source of power. The shaft B has its bearings in standards C C′, which are firmly secured to a post or other fixed part in the building. Said shaft extends through one of the standards C C′ and through a disk or arm, D, and it carries on its outer end a bevel-wheel, E. The disk or arm D is connected to the spindle or shaft B, so that it turns on the same, and that it can be secured in any desired position, if desired. To accomplish this object it is provided with a bearing, *a*, which extends into the journal-box *b*, so that by screwing down the cap of this box the arm or disk D is firmly held in position. Said arm or disk is provided with a second bearing, *c*, which supports the arbor *d*, one end of which carries a bevel-wheel, F, gearing into the bevel-wheel E, on the end of the shaft B, and the other end of which connects by a universal joint, *e*, with the extension-rod G. In some cases the swivel-arm D and arbor *d* may be dispensed with and the extension-rod connected directly to a universal joint at the end of the shaft or driving-spindle B. The extension-rod is constructed in the manner of a telescope, so that it can be lengthened or shortened at pleasure, and it is adjusted at the desired length by set-screws or other suitable means. It transmits the motion from the driving-shaft B to the bore-spindle H.

The connection between the extension-rod and bore-spindle is effected by a swivel-arm, *h*, provided with two bearings similar to the swivel arm or disk D. One end of said swivel-arm forms the bearing for the end of the extension-rod, or for a short arbor, *f*, connected to the same by a universal joint, *g*, and its other end forms the bearing for the bore-spindle, as clearly shown in Fig. 1 of the drawings. The arbor *f* carries a bevel-wheel, I, which gears into a bevel-wheel, J, on the bore-spindle, so that the rotary motion of the extension-rod is transmitted to the bore-spindle and to the drill, inserted into a socket in one end of the same. The pointed end of the bore-spindle turns in a center in the end of a hand-screw, K, which screws into a head, L, that is adjustable in the slotted arm M. This arm is secured to a standard, N, being adjustable on the same by a set-screw, *i*, and the standard N is screwed or otherwise fastened to the desired spot on the work to be drilled.

By means of the universal joints *e g*, and of the swivel arm or disk D the extension-rod G can be carried all round the shaft B and set in any desired direction. The extension-rod can be lengthened and shortened to carry the drill to the spot where a hole is to be drilled, and the drill can be turned up or down, or in any other direction which may be desirable.

I claim as new and desire to secure by Letters Patent—

1. The swivel arm or disk D, in combination with the driving-shaft B, constructed and operating substantially as and for the purpose set forth.

2. The swivel-arm *h*, in combination with a suitable driving-shaft, and with the bore-spindle H, constructed and operating substantially as and for the purpose specified.

JOHN MEYER.

Witnesses:
WM. F. MCNAMARA,
J. P. HALL.